June 13, 1933.                C. W. MILLER ET AL                1,913,939
VEHICLE CHASSIS SPRING STRUCTURE
Filed April 18, 1930

INVENTOR
CLARENCE W. MILLER AND
BY GILBERT C. GOODE.
ATTORNEY

Patented June 13, 1933

1,913,939

UNITED STATES PATENT OFFICE

CLARENCE W. MILLER, OF DETROIT, AND GILBERT C. GOODE, OF BIRMINGHAM, MICHIGAN, ASSIGNORS TO CHRYSLER CORPORATION, OF DETROIT, MICHIGAN, A CORPORATION OF DELAWARE

VEHICLE CHASSIS SPRING STRUCTURE

Application filed April 18, 1930. Serial No. 445,484.

This invention relates to an improved vehicle spring supporting construction, particularly for busses and trucks.

The main objects of our invention are to provide an improved spring suspension in a vehicle chassis for resiliently supporting the chassis frame and body of a vehicle upon the road wheel supporting structure thereof; to provide auxiliary springs between the chassis frame and wheel supporting structure which normally remain inactive when the vehicle is empty; to provide a pair of springs of this kind, each of which is adapted to be brought into operation at different loads of the vehicle; to provide improved resilient supporting means for a vehicle frame of the type which has a longitudinal central beam forming the body structure of the frame; and to provide a spring suspension in which substantially conventional longitudinal leaf spring members are used in conjunction with auxiliary transverse springs, for normally supporting the initial weight of the vehicle body and chassis and limited additional weight, the transverse springs being located with respect to the frame of the vehicle chassis so as to individually become operative as the load of the vehicle is increased.

Further objects of our invention are to provide improved means for movably supporting the ends of a leaf spring member; and to provide means of this kind which frictionally retards relative movement of the ends of the springs.

An illustrative embodiment of this invention is shown in the accompanying drawing, in which.

Figure 1:
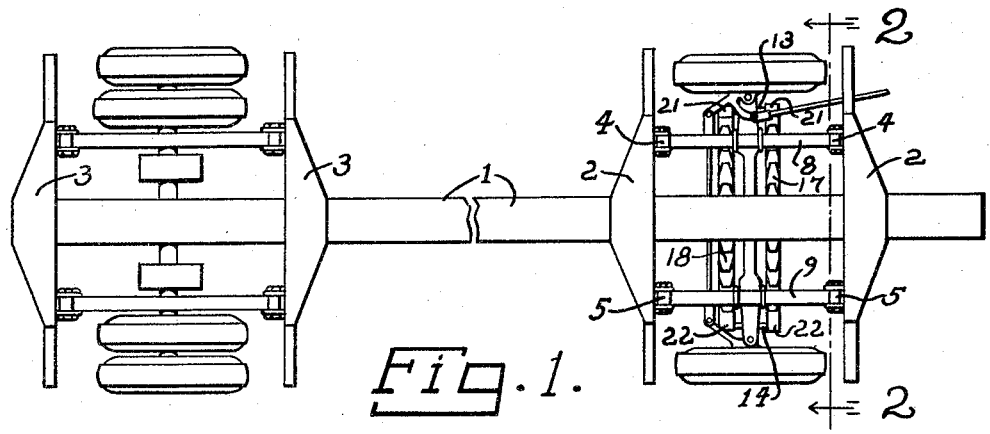
Fig. 1 is a top plan view of a bus chassis embodying our invention.

In the form shown, our improved spring supporting structure is illustrated in connection with a bus chassis having a frame comprising a longitudinal fabricated column 1 forming a central beam on which laterally extending pairs of cross members 2 and 3 are mounted. Formed on the adjacent sides of the front pair of cross members 2 are brackets 4 and 5 which are located substantially equal distances from the respectively opposite sides of the center beam 1. Shackles 6 and 7 are journaled on the brackets 4 and 5 respectively. Leaf spring members 8 and 9 are pivoted at their ends on the shackles 6 and 7 respectively. These springs extend longitudinally of the vehicle chassis and are provided at their intermediate portions with U shaped clamps 10 and 11 by means of which the intermediate parts of the springs are rigidly mounted on an axle 12 or other wheel supporting structure.

Bars 13 and 14 are rigidly mounted on the lower side of the axle 12 at the respectively opposite end portions thereof. These bars extend rearwardly and forwardly of the axle 12 substantially at right angles thereto. Journaled on the front and rear end portions of the bars 13 and 14 are blocks 15 and 16 respectively on which the ends of transverse leaf spring members 17 and 18 are shiftably mounted. The leaf spring members 17 and 18 are bowed upward at their intermediate portions and are provided with metal bands 19 and 20 which register with the center beam 1 of the chassis frame. The ends 21 and 22 of the transverse springs 17 and 18 are substantially U shaped and they frictionally grip the outer surfaces of the blocks 15 and 16.

Normally the longitudinal springs 8 and 9 support the initial weight of the vehicle chassis and the body and the intermediate parts of the springs 17 and 18 are located in spaced relation to the center beam 1, the intermediate part of the transverse spring 17 being further from the center beam 1 than the corresponding portion of the transverse spring 18. In the illustration shown my improved spring construction is illustrated in connection with the front axle of a vehicle but it is understood that substantially the same construction may be applied to the rear axle thereof.

Figure 2:
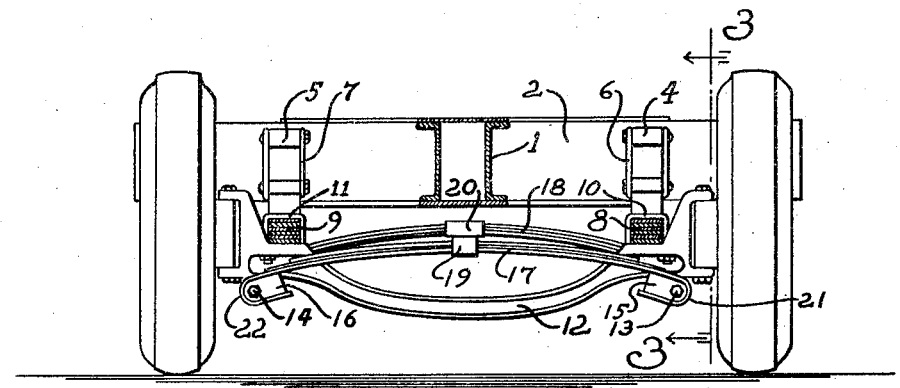
Fig. 2 is a transverse vertical section taken on line 2—2 of Fig. 1.
Figure 3:
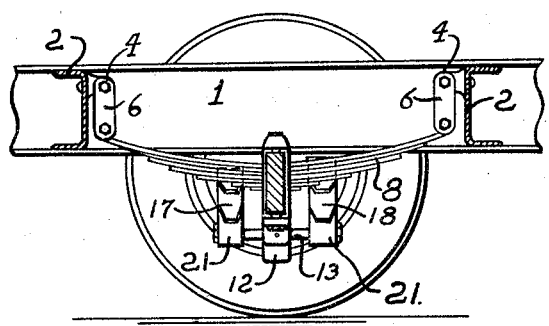
Fig. 3 is a vertical section taken on line 3—3 of Fig. 2.

In operation, when the vehicle is empty the springs 8, 9, 17 and 18 are in the respective positions shown in Fig. 2. As the load of the vehicles increases the center beam 1 moves downwardly until it engages the metal band 20 of the transverse spring 18. Under these conditions the spring 18 aids the longitudinal springs 8 and 9 in supporting the weight of the vehicle chassis, body and contents thereof. Further increase in the load of the vehicle causes the center beam 1 to move downwardly compressing the longitudinal springs 8 and 9 and the transverse spring 18 further until the beam 1 seats upon the transverse auxiliary spring 17 which under these conditions also assists in yieldably supporting the chassis, body and contents thereof.

During compression of the auxiliary transverse springs 17 and 18 their end portions move outwardly in respectively opposite directions against the frictional engagement of the U shaped end portions to the surfaces of the blocks 16 and 17. This frictional action retards the downward movement of the beam 1 somewhat and adds substantial rigidity to the transverse spring members.

Although but one specific embodiment of this invention has herein been shown and described, it will be understood that various changes including the size, shape and arrangement of parts may be made without departing from the spirit of our invention and it is not our intention to limit its scope other than by the terms of the appended claims.

We claim:

1. A vehicle chassis having a frame member and a wheel supporting member, longitudinal springs between said members for yieldably holding the same apart, and transverse auxiliary springs slidably secured at their ends on one of said members and normally in different spaced relations to the other member and engageable therewith at different degrees of compression of said main springs.

2. A vehicle chassis having a frame member and a wheel supporting member, longitudinal springs between said members for yieldably holding the same apart, and a pair of transverse springs shiftably mounted on one of said members, each normally in differently spaced relations with the other member.

3. A vehicle chassis having a frame and wheel supporting structure, conventional leaf springs between said frame and said wheel supporting structure extending longitudinally of said chassis, and a pair of leaf springs extending transversely of said chassis, one on each side of said wheel supporting structure in spaced relation to said frame and engageable therewith when said longitudinal springs are under compression, said transverse springs being normally at respectively different distances from said frame so as to individually become operative during compression of said longitudinal springs.

4. In a vehicle chassis a chassis frame, wheel supporting structure, means yieldably supporting said frame on said structure, friction blocks journaled on respectively opposite end portions of said wheel supporting structure, and transverse springs frictionally engaged on said blocks, the intermediate portions of said springs being engageable by said frame for resisting downward movement thereof when said vehicle is under a predetermined compression.

CLARENCE W. MILLER.
GILBERT C. GOODE.